Aug. 13, 1968  J. O. SKUNDBERG  3,396,578
GLUE BOND TESTER
Original Filed Dec. 4, 1963
4 Sheets-Sheet 1
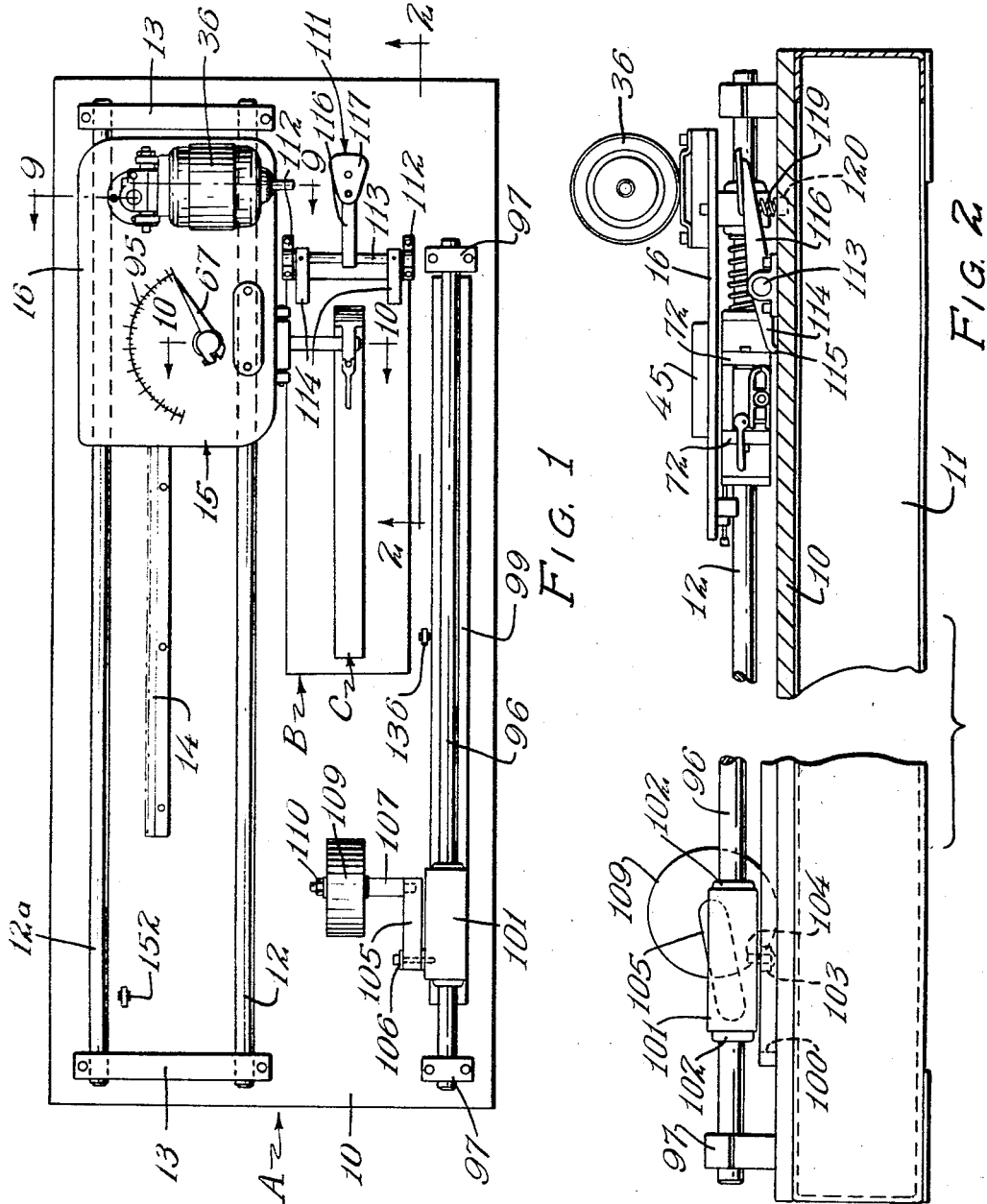
INVENTOR
JAMES O. SKUNDBERG
BY Robert M. Dunning
ATTORNEY

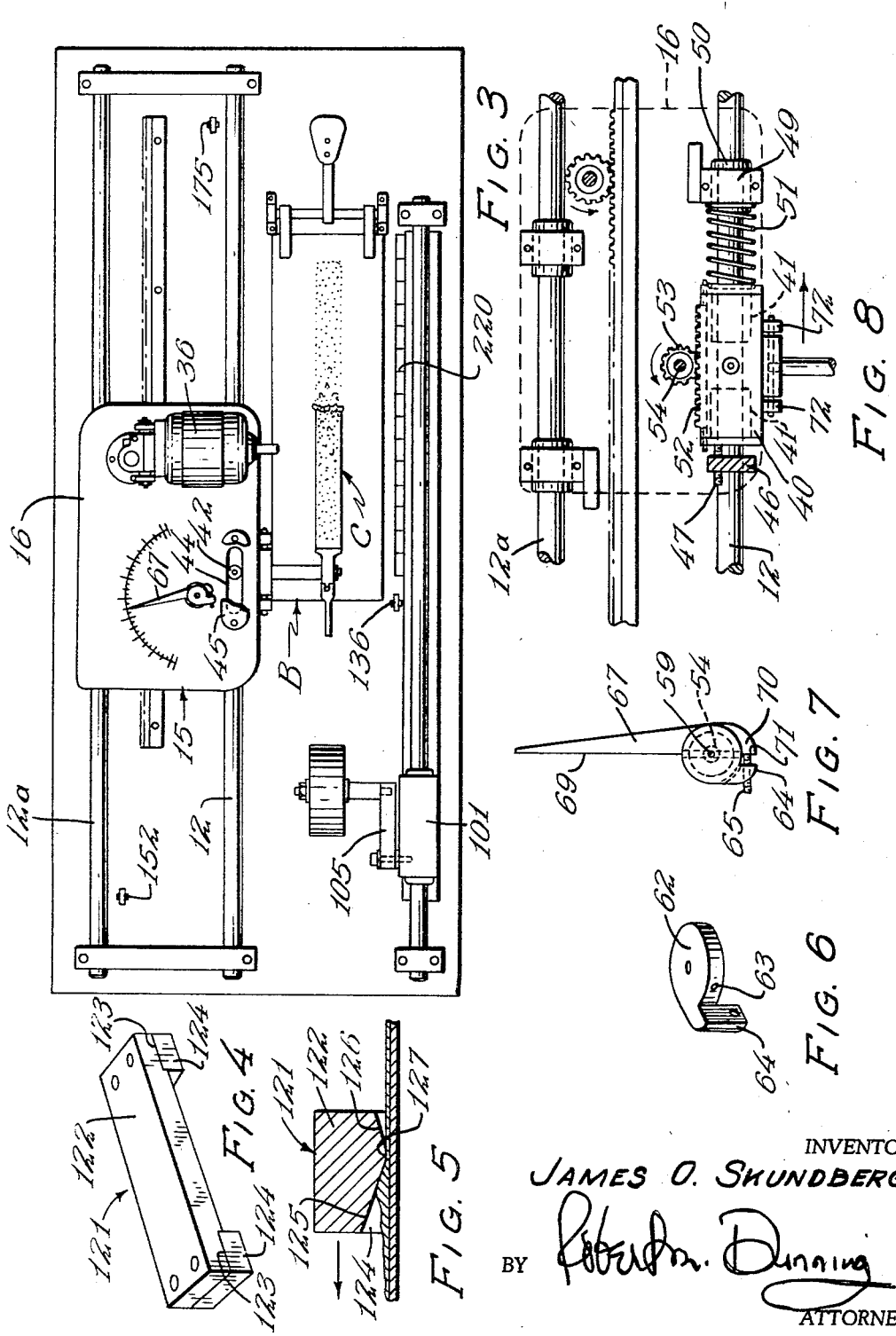

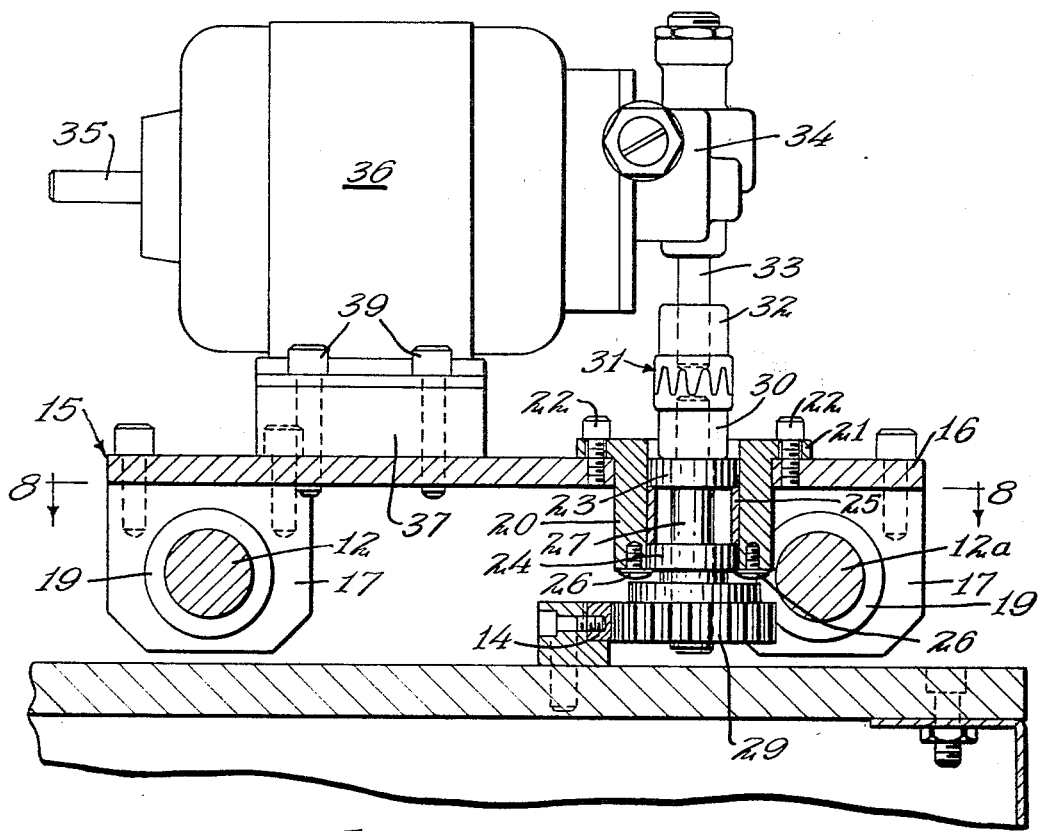
FIG. 9
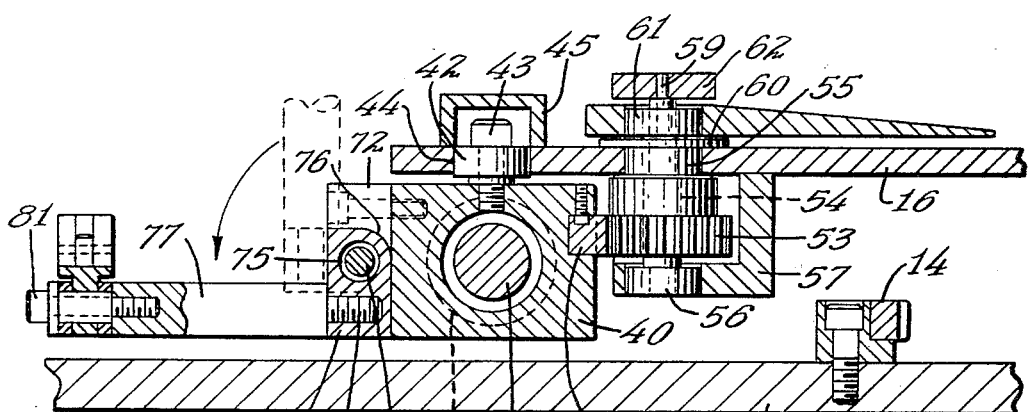
FIG. 10
FIG. 11
INVENTOR
JAMES O. SKUNDBERG
BY
ATTORNEY

INVENTOR
JAMES O. SKUNDBERG

United States Patent Office 3,396,578
Patented Aug. 13, 1968

3,396,578
GLUE BOND TESTER
James O. Skundberg, St. Paul, Minn., assignor to Waldorf Paper Products Company, St. Paul, Minn., a corporation of Minnesota
Continuation of application Ser. No. 327,894, Dec. 4, 1963. This application July 11, 1966, Ser. No. 574,862
8 Claims. (Cl. 73—150)

This application is a continuation of my previously filed application Ser. No. 327,894, filed Dec. 4, 1963, now abandoned.

This invention relates to an improvement in glue bond tester and deals particularly with an apparatus designed to test the effectiveness of an adhesive bond between two surfaces.

For many years the determination of the effectiveness of different adhesives on various types of paperboard has been somewhat of a hit or miss proposition. Considerable difficulty has been experienced in providing a uniform means of testing the adhesive bond. The effectiveness of the seal between two pieces of paperboard varies with the amount of adhesive applied, with the amount of pressure used to affect the seal, and with the time involved between the time the adhesive is applied and the time the test is made. Certain types of adhesive will work very effectively on some surfaces and not on others. Some adhesives will work effectively on one type of gluing machine where the parts adhered are held under compression for a relatively long period of time, but will not be effective if the sheets are under compression for a shorter time period. In most carton converting plants, the effectiveness of the gluing operation is determined by trial and error. However, such a method can result in very considerable losses, for if the glue bond of the manufacturer's joint is not effective, thousands of improperly glued cartons may pass through the gluer before the error is noticed.

An object of the present invention resides in the provision of an apparatus for measuring the effectiveness of a glue bond in which most of the variables are eliminated. A means is provided for applying a measured thickness of an adhesive to one of the surfaces to be adhered. A strip of paperboard which forms the second surface to be adhered then is applied to the adhesive and pressed into place by a predetermined compressive force. At the completion of the adhering operation, a timer is started to permit the two surfaces adhered to remain in face contact for a predetermined length of time. At the completion of this time period, a means is provided for peeling one strip from the other. The amount of force required to separate the two surfaces is measured by a suitable indicator. The point at which the adhesive bond ceases to separate and the adhesive starts to remove portions of a surface of the paperboard is noted. As a result, the type of adhesive which should be used for adhering various surfaces can be readily determined, and the effectiveness of a certain type of adhesive with certain types of paper or paperboard can be predicted in advance to the actual gluing operation.

An object of the present invention resides in the provision of a means for supporting a paperboard base sheet on a flat surface, a means for applying a predetermined thickness of adhesive to the surface of the base sheet, and a means for applying a predetermined sealing pressure to effect the bond between the applied strip and the base sheet. This latter means preferably comprises a roller of a desired weight which can be moved throughout the length of the applied strip first in one direction and then in the other. A carriage is supported for movement on a trackway extending parallel to the applied strip and is moved longitudinally of the trackway at a predetermined speed.

The carriage yieldably supports an arm bearing a clamp which engages one end of the applied strip. As the carriage moves through its path, the clamp acts to peel the applied strip from the base sheet. A means is provided so that as the arm yields relative to the carriage, the relative movement between the arm and the carriage operates an indicator which discloses the pulling force required to tear the adhered surfaces apart.

A further feature of the present invention resides in the provision of an apparatus of the type described which includes a scale mounted upon a flat surface adjoining the base sheet which is in a predetermined relation to the base sheet and to the strip adhered thereto. This scale may be used to provide a determination of the point at which the adhesive bond ceases to separate and the pulling force starts to tear the surface of the paper. By this means, an accurate determination of the setting time of the adhesive may be obtained.

A further feature of the present invention resides in the fact that the thickness of the layer of adhesive may be accurately determined. A pool of adhesive is placed upon the base sheet in a predetermined location, and the adhesive is spread longitudinally of the base sheet by a spreading bar having ends which extend slightly below the level of the center portion of the bar. As a result, the thickness of the adhesive film is controlled by the space between the center portion of the spreading bar and the base sheet.

These and other objects and novel features of the present invention will be more clearly and fully set forth in the following specification and claims.

In the drawings forming a part of the specification:

FIGURE 1 is a top plan view of the glue bond tester in readiness for use.

FIGURE 2 is a side elevational view which is partially broken away and which is shown partially in cross section along the line 2—2 of FIGURE 1.

FIGURE 3 is a view similar to FIGURE 1, but showing the glue bond tester in operation.

FIGURE 4 is a perspective view of the spreader used for applying the adhesive to the base sheet.

FIGURE 5 is a sectional view on a vertical plane through the spreader illustrated in FIGURE 4.

FIGURE 6 is a perspective view of the pointer operating arm.

FIGURE 7 is a top plan view showing the pointer and pointer operating arm in engagement.

FIGURE 8 is a horizontal section beneath the platform of the movable carriage, the position of the section being indicated by the line 8—8 of FIGURE 9.

FIGURE 9 is a vertical sectional view on the line 9—9 of FIGURE 1.

FIGURE 10 is a vertical sectional view through the indicator operating mechanism, the position of the section being indicated by the line 10—10 of FIGURE 1.

FIGURE 11 is a detailed view of the clamp used for gripping the ends of the paperboard strip.

Figure 12:
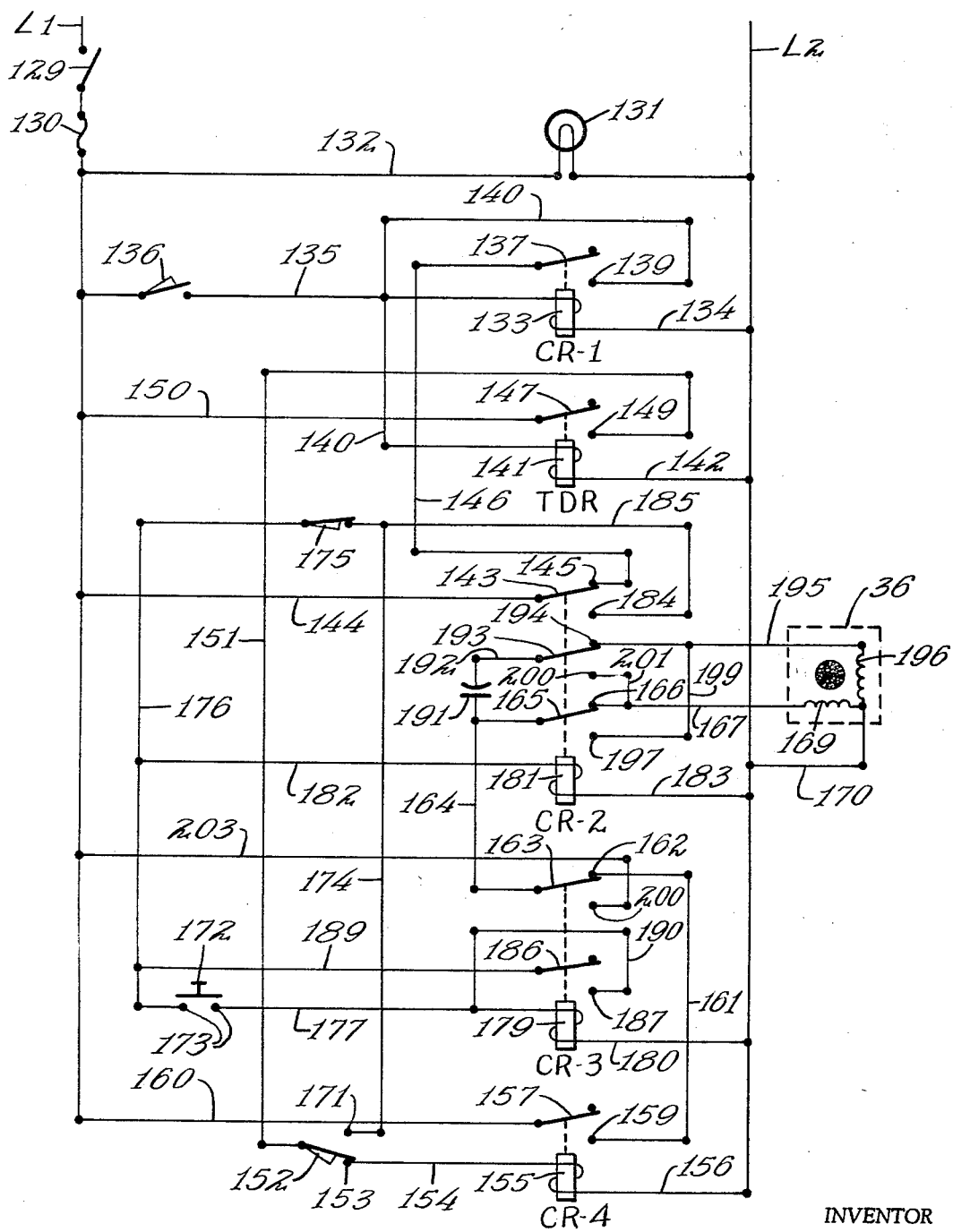
FIGURE 12 is a diagrammatic view of the wiring diagram of the apparatus.

The tester is indicated in general by the letter A and includes a table or platform 10 which is supported above a suitable supporting surface, not illustrated in the drawings, by a rectangular base portion 11 of channel-shaped cross section.

A pair of parallel slides 12 and 12a are supported above the surface of the table 10 by means of supporting blocks 13 located near opposite ends of the table. A gear rack 14 extends longitudinally of the table 10 between the slides 12 and 12a. For a purpose which will be later described. A carriage 15 is slidably supported upon the track formed by the parallel guides 12 and 12a. As is indicated in FIGURE 9, the table 15 includes a platform 16 having downwardly extending lugs 17, near opposite ends thereof and which support bearings or bushings 19 encircling the slides 12. The platform 16 is thus slidably supported upon the track and is generally horizontal.

A sleeve 20 extends vertically through the platform 16 near one end thereof and is provided at its upper end with a peripheral flange 21 which overlies the surface of the platform. The flange 21 and sleeve 20 are held in fixed position by cap screws 22 or other suitable means extending through the flange and into the platform 16. A pair of vertically spaced bearings 23 and 24 are supported within the sleeve 20 and are held in spaced relation by a spacer sleeve 25. The lower bearing is held in position in the sleeve 20 by the heads of retaining bolts 26.

A shaft 27 is rotatably supported in the bearings 23 and 24 and is provided at its lower end with a pinion 29 which is in mesh with the teeth of the rack 14. The lower portion 30 of a coupling 31 is secured to the shaft 27 and rests upon the upper bearing 23 to hold the shaft from axial movement. The upper portion 32 of the coupling 31 is secured upon the vertical shaft 33 of a reduction gear unit 34 driven by the shaft 35 of a motor 36. The motor 36 is supported by spacer blocks 37 and secured to the plaform 16 by cap screws 39.

An elongated generally rectangular block 40 encircles the slide shaft 12 and includes a pair of longitudinally spaced bearings 41 which are recessed into apertures in opposite ends of the block. As indicated in FIGURE 10 of the drawings, a roller 42 is mounted on a pivot pin 43 threaded into the upper surface of the block 40 near the center thereof. The roller 42 is slidable in a slot 44 which extends through the platform 16. An enclosing housing 45 preferably overlies the slot 44 to prevent foreign material from entering the slot. The block 40 is somewhat shorter than the length of the platform 16, the platform being indicated in dotted outline in FIGURE 8 of the drawings as the position of the section is immediately below the level of the platform. A stop lug 46 extends downwardly from the platform 16 and an adjustable stop pin or screw 47 extends through the lug 46 in the direction parallel to the axis of the slide 12 to engage the end of the block 40 and to limit movement of the block in one direction. A second stop lug 49 is secured to the under surface of the platform 16 and includes a bearing or bushing 50 through which the slide 12 extends. A spring 51 is interposed between the stop lug 49 and the block 40 encircling the slide 12, the purpose of the spring 51 being to urge the block 40 against the adjustable stop pin 47.

As indicated in FIGURES 8 and 10 of the drawings, a gear rack 52 is mounted upon the side of the block 40 and the teeth of the rack 52 are in mesh with a pinion 53 mounted on a vertical shaft 54, the upper end of which extends through the platform 16. An upper bearing 55 is mounted in the platform 16 and a lower bearing 56 is mounted in an L-shaped bracket 57 secured beneath the platform 16. The bearings 55 and 56 support the vertical shaft 54. The upper end of the shaft 54 extends through an indicator mount 60 and a bearing 61. A reduced diameter upper end 59 of the shaft 54 extends into or through an indicator drive disk 62 and is secured thereto by a pin or set screw extending radially of the disk 62 as indicated in FIGURE 6 of the drawings at 63. The periphery of the drive disk 62 is provided with a downwardly projecting arm 64. The arm 64 is drilled on a plane normal to the axis of the shaft 54 to accommodate a set screw 65 extending tangentially to a hypothetical circle about the shaft axis as indicated in FIGURE 7. The indicator comprises a disk-like portion which encircles the bearing 61 and has an integral pointer arm 67, one edge 69 of which is on a vertical plane through the axis of the shaft 54. The bearing encircling portion of the indicator is also provided with a projecting arm 70 which also terminates in a shoulder 71 which is on a vertical plane through the axis of the shaft 54 which, in the structure illustrated, is diametrically opposed to the pointer edge 69. This shoulder 71 may be engaged by the set screw 65 to rotate the freely rotatable indicator pointer in unison with the shaft 54. A pair of vertical flanges 72 are supported on the side of the block 40 opposite that supporting the rack 52. A pivot shaft 73 extends through the flanges 72 on an axis parallel to the axis of the slide 12. A pivot block 74 is transversely drilled to accommodate a bearing 75 which encircles the pivot shaft 73. One corner of the pivot block 74 is rounded as indicated at 76 to permit the pivotal movement of the pivot block through an angle of approximately 90° from a vertical position to a substantially horizontal position. A clamp supporting shaft 77 is provided with a reduced diameter threaded end portion 79 which is threaded into the outer vertical surface of the block when the block is in vertical position. The clamp supporting shaft 77, in this position of the pivot block, extends parallel to the table 10 and is spaced somewhat above the level of the table. The clamp supporting shaft enters the block 74 below the level of the axis of the pivot shaft 73 to urge the block into one extreme position by its weight.

A clamp indicated in general by the numeral 80 is secured to the end of the shaft 77 by a cap screw 81 or other suitable means. The clamp 80 in the form illustrated includes a lower arm 82 having a pair of spaced parallel upwardly projecting ears 83 which encircle a portion of the cap screw 81; and an upper arm 84 which includes a downwardly extending ear 85 which extends between the ears 83 and also encircles a part of the cap screw 81. The lower arm 82 is provided with an upwardly projecting jaw 86 on one end thereof, and the upper arm 84 is provided with a cooperable downwardly projecting jaw 87 on one end. A spring or similar resilient means 89 is positioned between the other ends of the arms to urge the jaws in clamping position.

In order to open the jaws, a pin 90 is provided extending through the other clamping arm ends and through the spring 89, the pin is provided with a head 91 at its lower end. The upper end of the pin 90 extends between a pair of eccentrics 92 and are pinned thereto by a pivot pin 93. The eccentrics 92 are connected by an operating handle 94. By pivoting the handle 94 in a clockwise direction as viewed in FIGURE 11, the spring 89 may be compressed and the jaws 86 and 87 opened to admit the end of the paperboard strip.

As indicated in FIGURES 1 and 3 of the drawings, the platform 16 is provided with a scale 95 arcuately arranged about the axis of the indicator shaft 54 and cooperable with the pointer 67 to provide a reading. The scale 95 is calibrated to indicate the force necessary to move the block 40 relative to the carriage 15, as the carriage moves along the track 12, 12a.

As indicated in FIGURES 1, 2, and 3 of the drawings, a slide rod 96 is supported in parallel spaced relation to the table 10 by means of supporting blocks 97 at opposite ends thereof. A track 99 is mounted upon the table 10 directly beneath the guide rod 96. The track 99 is either made of two spaced bars or is slotted as indicated at 100. A tubular rider 101 encircles the guide rod 96 and is slidably supported thereupon by bearings 102 recessed into opposite ends of the body of the rider. A roller 103 is rotatably mounted upon a pivot pin 104 threaded into the under surface of the rider 101 and engageable in the track 99 to hold the rider from rotation about the axis of the guide rod 96. An arm 105 is pivotably supported by a horizontal pivot pin 106 to the inner side of the rider 101, the arm 105 supporting a roller shaft 107 with its axis parallel the axis of the pivot pin 106. A heavy roller 109 is rotatably mounted upon the shaft 107 and is secured in position by a retaining nut 110 or other suitable means.

A base sheet supporting clamp 111 is supported by the table 10 near one end of the table between the guide rod 96 and the track member 12. The clamp 111 is supported by a pair of bearing blocks 112 extending upwardly from the surface of the table to support a shaft 113 extending transversely of the table 10. The shaft 113 supports a pair of parallel spaced clamping arms 114 which are shown in FIGURE 2 to have down turned clamping jaws 115. The shaft 113 also supports an intermediate operating arm 116 extending in a direction opposite to the clamping arms 114 and having a bearing plate 117 at its outer extremity by means of which the operating arm may be operated. A spring 119 has its lower end engaged in a socket 120 in the table 10 and engages against the under surface of the operating arm 116 to urge the jaws 114 into clamping position.

A glue spreading device 121 is shown in FIGURES 4 and 5 of the drawings. The spreader 121 includes a generally rectangular block 122 which is notched along its under surface as indicated at 123 at opposite ends of the block to accommodate supporting legs 124. The under surface of the block 122 is milled or ground away to provide a downwardly and rearwardly inclined under surface portion 125 and an upwardly and rearwardly inclined portion 126, the inclined portions 125 and 126 adjoining at a round apex 127 which is spaced from the plane of the under surface of the blocks 124 a distance equal to the thickness of the film of glue to be applied. Obviously, the spacing may be measured in the thousands of an inch.

FIGURE 12 of the drawing indicates a wiring diagram which is used for controlling the apparatus. As indicated, a current is supplied by line wires L-1 and L-2. A main control switch 129 and fuse 130 are provided in at least one of the power lines. An indicating light 131 is provided in a conductor 132 connecting the line wires L-1 and L-2. The circuit includes a series of relays, the first of which is identified by the insignia CR-1. Relay CR-1 includes a relay coil 133, one terminal of which is connected to the line wires L-2 by a conductor 134. The other terminal of the coil 133 is connected by a conductor 135 which inludes a normally open starting switch 136 connected to line wire L-1. For the purpose of explanation, the switch 136 is the starting switch of the apparatus and lies in the path of a portion of the arm 105 pivotally attached to the rider 101. The switch 136 is directional so that the rider 101 may pass over the switch without actuating the same upon movement of the rider to the right as viewed in the drawings. However, upon movement of the rider to the left, the circuit is closed virtually at the instant when the overlying strip is pressed into contact with the base sheet as will be later described.

The switch blade or armature 137 of the relay CR-1 is moved into engagement with the contact 139 when the coil 133 is energized, the contact 139 being connected by the conductor 140 to the previously described conductor 135. The conductor 140 also leads to one terminal of the coil 141 of the second relay TDR, the other terminal of which is connected by conductor 142 to the line wire L-2. Thus the closing of the momentarily closed switch 136 also closed the time delay relay TDR. Relay CR-1 serves as a holding relay for the time delay relay. This circuit includes the switch blade 143 of a third relay CR-2 which is connected by a conductor 144 to line wire L-1 and is normally in contact with relay terminal 145 which is connected by a conductor 146 to the blade 137 controlled by relay CR-1. As soon as CR-1 coil 133 is energized, the circuit is closed from line wire L-1 through conductor 144, blade 143, contact 145, conductor 146, switch blade 137, contact 139, and conductor 140 to the coil 141 of TDR to hold coil 141 as long as relay CR-2 remains in unenergized condition.

The purpose of the time delay relay TDR is to delay the start of the motor 36 for a predetermined time period and thus to allow the adhesive to set for a predetermined length of time. The relay is adjustable so that the time which elapsed between the application of the sealing pressure and the start of the test may be regulated.

Energization of the time delay relay coil 141 functions after a predetermined time period to move the contact blade 147 into engagement with a contact 149 which closes a circuit to the coil of relay CR-4. This circuit extends from line wire L-1 through conductor 150, switch 147, contact 149, and conductor 151 to the forward limit switch 152 which is normally biased toward contact 153. Contact 153 is connected by conductor 154 to the coil 155 of relay CR-4, the other terminal of which is connected by conductor 156 to L-2 thereby closing the circuit.

Energization of the coil 155 draws the relay armature 157 against the contact 159 closing a circuit from L-1 through a conductor 160, blade 157 and contact 159 to conductor 161 leading to the normally closed contact 162 engaged by the armature 163 of relay CR-3. The blade 163 is connected through conductor 164 to the armature 165 of relay CR-2 normally biased toward contact 166 connected by conductor 167 to the field coil 169 of the split phase motor 36, the other terminal of the coil being connected by the conductor 170 to L-2. The motor 36 therein starts its movement moving the carriage 15 toward the left as viewed in the drawings or in a so called forward direction. As indicated in FIGURES 1 and 3 of the drawings, the forward limit switch 152 is in the path of movement of the carriage 15 and at the end of the forward movement of the carriage the switch 152 is engaged with a contact 171 and the circuit to the coil of relay CR-4 is broken, stopping the motor 36.

The return of the carriage 15 to its normal position is initiated by the manually operable return switch 172 which momentarily connects contacts 173. The operation of the switch 172 closes a circuit to energize both CR-2 and CR-3. This circuit extends from L-1 through conductor 150, relay armature 147 contact 149, conductor 151, forward limit switch 152, contact 171, conductor 174, normally closed back limit switch 175, conductor 176, manually operable switch 172, conductor 177, and the relay coil 179 of CR-3, the other terminal of which is connected to line wire L-2 by conductor 180. The coil 181 of relay CR-2 is simultaneously energized by the conductor 182 leading from conductor 176 through the coil 181 and conductor 183 to L-2. Energization of the relay CR-2 moves the armature 143 into engagement with contact 184 closing a circuit in parallel with the forward limit switch 152 to maintain the relay CR-2 and CR-3 energized after the forward limit switch becomes disengaged and open the circuit. This latter circuit extends from L-1 through the conductor 144 relay armature 143, contact 184, conductor 185, back limit switch 175, conductor 176, and conductor 182 to the coil 181 of CR-2 The armature 186 of relay CR-3 has been drawn into engagement with contact 187, the blade 186 being connected by conductor 189 to 176. A contact 187 is connected by conductor 190 to conductor 177 thus holding the relay CR-3 energized.

Relay CR-2 functions to reverse motor 36. In the position illustrated, a phase shifting capacitor 191 is provided in a conductor 192 leading from the conductor 164 to the relay armature 193 normally engaged with the contact 194 and connected by conductor 195 to the second field coil 196, the other terminal of which is connected to line wire L-2 by conductor 170. When CR-2 is energized, the relay armature 165 engages a contact 197 which is connected by conductors 199 and 195 to the second coil 196. This cause the motor 36 to rotate in a reverse direction, moving the platform 16 to the right as indicated in the drawings. At the same, the armature 193 in engaged with contact 200 connected by conductor 201 to the conductor 167 leading to coil 169 thus placing the phase shifting capacitor 191 in this circuit.

Energization of relay CR-3 caused the armature 163 to engage contact 202 closing a circuit from L-1 through conductor 203, contact 202, armature blade 163, to energize the field coils of the motor 36. In other words, relay CR-3 makes and breaks the circuit to the reverse field coil 196 while relay CR-4 acts through the normally closed contact 162 of CR-3 to control a current to the field coil 169 to drive the motor in a forward direction.

The motor 36 continues to drive the carriage 15 towards its starting position until it engages the back limit switch 175 which breaks the circuits to relays CR–2 and CR–3. It should be mentioned that the energization of CR–2 breaks the circuit previously energizing CR–1 and TDR thereby resetting these relays to that the entire system is disconnected once the carriage 15 returns to its starting position. The location of the back limit switch 175 is indicated in FIGURE 3 of the drawings.

In the description of the wiring diagram, the manner in which the carriage is reciprocated has been described. The motor 36 rotates first in one direction and the other, acting through the pinion 29 to move the carriage at a constant speed along the length of the rack 14. The general operation of the testing methods will now be described.

A backing sheet B is placed upon the table 10 with the surface to be tested uppermost. It is placed in position against the bearing blocks 112 while the clamp operating lever 116 is depressed, and the jaws 115 are lowered to hold the end of the backing sheet firmly against the table 10. With the parts in the position illustrated in FIGURE 1, a pool of the adhesive to be used is placed upon the backing sheet near the clamped end thereof, and the spreader 121 is placed upon the sheet outwardly of the pool of adhesive. The spreader is moved longitudinally of the backing sheet to a point closely adjoining the other end thereof. It is found that with experience, the operator will learn to employ just about the proper quantity of adhesive to adhere the overlying strip C. However, it is also possible to wipe off excessive adhesive after the overlying strip C has been applied.

The overlying strip C is next placed lightly upon the film of adhesive. The forward end of the overlying strip is curled upwardly to overlie the adjoining portion of the strip, and is inserted between the clamping jaws 86 and 87 of the clamp 80. The time required to go through these steps is surprisingly uniform. The test may now be started.

The operator grasps the rider 101 and moves the same to the right on the guide bar 96, the roller being moved through the extent of its movement and then returned to its starting position. As the slider moves to the left on its return stroke, the starting switch 136 is momentarily closed, starting the apparatus in operation in the manner described. The movement of the roller 109 over the strip C causes the two sheets to be pressed together with a predetermined weight. Thus the overlying strip is always pressed into a position with an identical pressure.

When the starting switch is actuated the time delay relay causes a predetermined time delay which, for the purpose of example, may be 30 seconds. At the end of this time period, the motor 36 is energized, and the carriage 15 is moved along its track 12, 12a at a predetermined speed. As the carriage moves, the strip C is peeled off from the backing sheet B, the adhesive coated surface of the portion of the strip C removed being uppermost as indicated in FIGURE 3. At the start of the operation, unless the adhesive is a quick setting adhesive, the pull required to disengage the strip C is relatively small but this pull causes the block 40 to be moved to the right in the direction of the arrow relative to the carriage platform 16. In other words, the pull upon the strip C causes the spring 51 to compress, this action rotating the indicator shaft 54 to swing the pointer 67 in a clockwise direction. As the movement of the carriage is slow, the position of the pointer 67 relative to the length of travel as indicated on the scale 220 extending along the edge of the backing sheet B may be readily noted. Usually, the glue bond separates due to failure of the adhesive to adhere during the first part of the operation. However, as the adhesive continues to set, the pull measured by the pointer 67 usually increases until the adhesive joint fails to separate and a portion of the surface of one sheet will be torn away from the remainder of the sheet as a "tear bond" is developed. Usually the effectiveness of the adhesive increases throughout the operation. However, the most important point to be determined is the length of travel which takes place before the tear bond is accomplished and the pull required to effect this tear. The point at which the tear bond is effected can be readily noted from an examination of the backing sheet as the surface of this sheet will either show the first areas in which a portion of the sheet has been torn away or will otherwise show portions which have been torn from the overlying sheet.

The glue bond tester provides a more uniform means of testing a glue bond then has been previously produced insofar as the applicant is aware. The only variables encountered stem from the times required to spread the glue and apply the overlying sheet to the adhesive. In actual practice, it has been found that the time required to accomplish this work varies but one or two seconds with an experienced operator. Furthermore, the time required to apply the adhesive and to attach the strip comprises an extremely small part of the total test time, as the time delay relay usually provides a time delay which is many times the period of time required to position the overlying strip in place. Furthermore, up until the time the pressure roller has applied pressure to the strip, the two parts are not effectively adhered, and from this time on, the period is entirely automatic.

In accordance with the patent statues, I have described the principles of construction and operation of my glue bond tester, and while I have endeavored to set forth the best embodiment thereof, I desire to have it understood that obvious changes may be made within the scope of the following claims without departing from the spirit of the invention.

I claim:

1. A glue bond tester for use in determining the force required to detach an elongated flexible strip from a base sheet to which it is adhered at one end throughout a portion of its length, the tester including:
   a table,
   means adapted to secure said base sheet in face contact with said table with the attached strip extending in a predetermined direction,
   a carriage supported for movement relative to said table along a path parallel to said predetermined direction,
   a means slidably supported by said carriage for movement parallel to said predetermined direction between two extreme positions,
   resilient means urging said slidable means toward one said extreme position,
   attachment means on said slidable means parallel to said table and adapted to engage the other end of said strip and operable upon movement of said carriage, to peel said strip from said base sheet, the pull upon said attachment means tending to move said slidable means toward its other extreme position acting against the force of said resilient means,
   drive means for moving said carriage at a uniform rate along said path,
   and means for indicating the relative movement between said carriage and said slidable means.

2. The structure of claim 1 and including a scale located adjoining said base sheet and extending parallel to said predetermined direction.

3. The structure of claim 1 and in which said indicating means includes a rack on said slidable member parallel to predetermined direction,
   a pinion supported by said carriage and engaging said rack, and
   pointer means actuated by said pinion.

4. The structure of claim 1 and in which said indicating means includes a rack on said slidable member extending parallel to the direction of movement thereof, a shaft pivotally supported by said carriage and supporting a pinion engaged with said rack, a drive member rotatable with said shaft, and a pointer independently rotatably mounted coaxial with said shaft and rotated by said drive member.

5. The structure of claim 1 and including a roller, means supporting said roller on said table for movement along said predetermined direction and engageable with said strip to press the strip against said backing sheet with a predetermined pressure.

6. A glue bond tester for use in determining the force required to detach an elongated flexible strip from a flexible paperboard base sheet to which it is adhered along a portion of its length, the tester including:

a table having a generally flat upper surface portion, a means adapted to secure the flexible paperboard base sheet in face contact with said table portion with said base sheet extending in a predetermined direction, a roller supported on said table for movement back and forth over said base sheet in both directions, said roller being operable to press the strip against the base sheet with a predetermined force when the strip is positioned in the path of movement of said roller, a carriage mounted on said table for movement parallel to said predetermined direction, means carried by said carriage engageable with an end of said strip and operable, upon movement of said carriage, to peel the strip from said base sheet, means actuated by the pulling force upon said last named means to indicate the pull exerted thereupon, electrically operated drive means for moving said carriage along said table, a normally open power circuit to said drive means, and control means actuated by movement of said roller out of contact with said strip to close said power circuit and to initiate movement of said drive means.

7. The structure of claim 6 and in which said control means is actuated by movement of said roller in but one of said directions.

8. A glue bond tester for use in determining the force required to detach an elongated flexible strip from a base sheet to which it is adhered along a portion of its length, the tester including:

a table having a generally flat upper surface portion, a means adapted to secure a base sheet in face contact with said table portion, a roller supported on said table for movement over said base sheet in a predetermined direction, said roller being operable to press the strip against the base sheet with a predetermined force when the strip is positioned in the path of movement of said roller, a carriage mounted on said table for movement parallel to said predetermined direction, means carried by said carriage engageable with an end of said strip and operable, upon movement of said carriage, to peel the strip from said base sheet, means actuated by the pulling force upon said last named means to indicate the pull exerted thereupon, drive means for moving said carriage along said table, control means actuated by movement of said roller over said strip to initiate movement of said drive means, and means connected to said control means for providing a time delay between the time of actuation of said control means and the initiation of said movement of said carriage.

References Cited

UNITED STATES PATENTS

| | | | |
|---|---|---|---|
| 816,032 | 3/1906 | Oertel | 73—143 |
| 2,752,780 | 7/1956 | Gershberg | 73—150 |
| 3,129,586 | 4/1964 | Allen et al. | 73—150 X |

RICHARD C. QUEISSER, *Primary Examiner.*

J. W. MYRACLE, *Assistant Examiner.*